May 22, 1962   I. R. LOSS   3,035,599
VALVE PURGING
Filed April 13, 1959
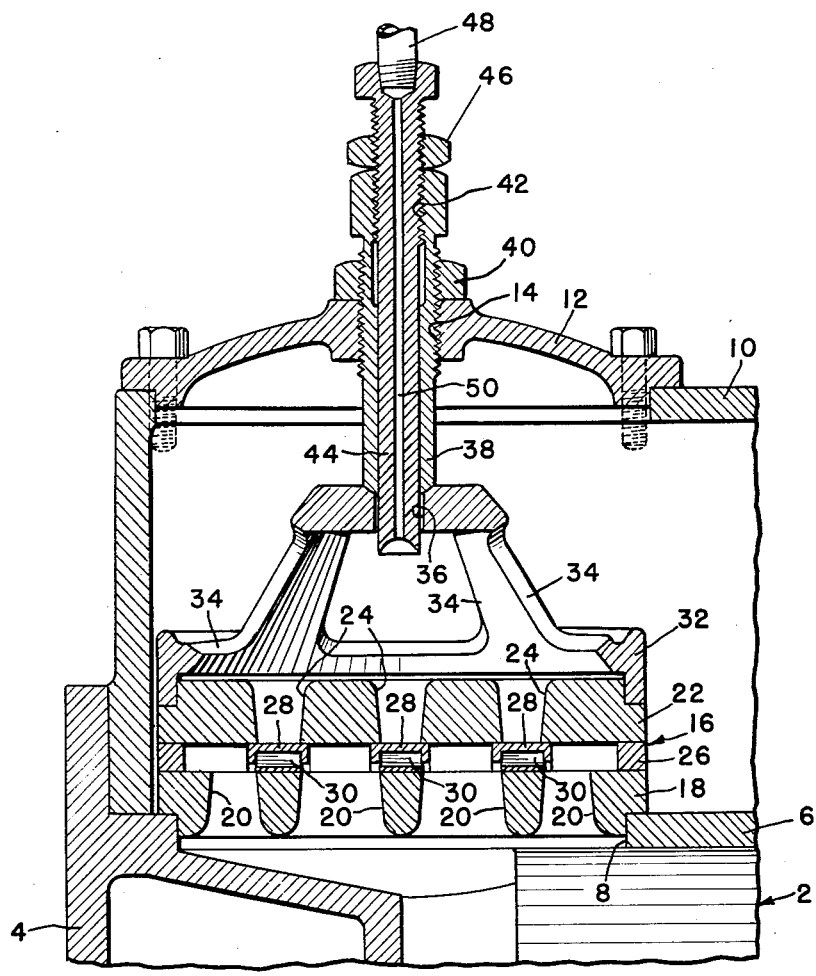
INVENTOR
ISIDORE R. LOSS
BY
HIS ATTORNEY.

3,035,599
VALVE PURGING
Isidore R. Loss, Phillipsburg, N.J., assignor to Ingersoll-Rand Company, New York, N.Y., a corporation of New Jersey
Filed Apr. 13, 1959, Ser. No. 805,901
4 Claims. (Cl. 137—240)

This invention relates to means for purging valves, and more particularly for the elimination of the adhesion of foreign solid residues on inlet valves of gas or air compressors.

With means in use today including mechanical and centrifugal filters it has been found nearly impossible to attain complete purity from carbon and other foreign solids in gases or air that are to be delivered to compressors. These foreign solids tend to adhere to the valve and valve seat faces, and, when the valve closes, they cause it to leak. As can be readily visualized, these leaks in the inlet valve of a compressor of this type seriously reduce the efficiency of the machine.

Accordingly it is the object of this invention to provide a valve for gaseous or air compressors which has a purging means provided to eliminate foreign solid build-up on the valve or valve seat faces and to permit perfect sealing relationships.

This and other objects will become apparent by reference to the following specification and drawing.

The drawing is a view in sectional elevation of a compressor inlet valve embodying the invention.

By reference to the drawing it will be noted that the compressor 2 has an end plate 4 and a side wall 6. The side wall 6 has an inlet 8 in which is located a valve assembly 16 that is unidirectional and is enclosed by an inlet manifold 10. The valve assembly 16 has a backing plate 18 with a plurality of outlet ports 20, and, a valve seat plate 22 having a plurality of inlet ports 24. Interposed between the two plates is an annular ring 26 which spaces the plates 18 and 22, one from the other, and provides an area for the location of the valve members 28 and their biasing springs 30. The ports 20 and 24 are in a staggered relative relationship and the backing plate 18 disposed between the ports 20 forms the spring seat. The valves 28 are biased by the springs 30 toward the valve seat plate 22 and close the various ports 24. A valve crab 32 engages the top of the valve seat plate 22, has a plurality of inlet openings 34 and a central opening 36.

The manifold 10 has an opening which is axially aligned with the inlet opening 8 and is closed by a cover 12 having a central threaded opening 14. A hollow bolt 38 screwed into the threaded hole 14 locks the valve assembly 16 in position and is fixedly retained by a nut 40. The hollow bolt 38 has an internally threaded portion 42 to receive a nozzle 44 also locked in position by a nut 46. A liquid delivery line 48 is screwed into the outer end of the nozzle 44 to supply pressure liquid to the nozzle. The nozzle 44 is adjustable axially in the threaded hollow bolt 38 to a predetermined distance from the ported valve plate 22 and the valves 30. Fluid under pressure delivered through the conduit 48 to the nozzle 44 enters a restricted passage 50 therein at relatively high velocities.

Air or gas is admitted to the compressor through the inlet manifold 10, the various ports or openings 34 in the valve crab 32, through the ports 24, across the valves 28 and into the compression compartment through the outlet ports 20 in the valve backing plate 18. The valve 16 opens to permit flow therethrough due to a differential in pressure. As fluid is ejected from the nozzle 44 it tends to fan out to cover the valve inlet ports 24 and the valves 28 and impinge thereon. In addition to its own velocity the liquid spray enters the flow path of the air or gas within the confines of the valve crab 32 and is additionally guided to the various valve elements thereby.

The force of the liquid spray impinging on the various parts of the valve assembly 16 tends to wash away the build-up of foreign solids and thus maintains clean mating surfaces for sealing. By reducing the orifice 50 in the nozzle 44 high velocities are attainable and super-saturation of the gases entering the compressor by the spray is prevented. The nozzle 44 is axially adjustable relative to the valve assembly 16 to vary the area that will be covered by the spray and thus may be set for optimum performance or reset for varying conditions such as changes in fluid velocity and air flow to the valve.

While I have shown and described a specific form of my invention, it is to be understood that various changes and modifications may be made without departing from the spirit of the invention as set forth in the appended claims.

I claim:
1. A valve assembly comprising, a seat member, a valve cooperating with said seat member, a fluid spray device to wash away accumulated solid material from the valve including a nozzle directed toward the valve in the direction of fluid flow, a conduit for supplying fluid to the valve, and a device to lock the valve seat in said conduit including a tubular bolt member, the nozzle being mounted in said tubular bolt member.

2. A valve assembly comprising, a seat member, a valve cooperating with said seat member, a fluid spray device to wash away accumulated solid material from the valve including a nozzle directed toward the valve in the direction of fluid flow, a conduit for supplying fluid to the valve, and a device to lock the valve seat in said conduit including a tubular bolt member, the nozzle being mounted in said tubular bolt member and being axially adjustable in the tubular bolt member toward and away from said valve to vary the size of the fluid spray.

3. A valve assembly comprising a seat member, a valve cooperating with the seat member, a valve crab disposed against the seat member, a hollow bolt in engagement with the valve crab, and a nozzle disposed in the hollow bolt and projecting into the valve crab and spaced from the seat member and the valve, the nozzle being movable in the hollow bolt toward and away from the seat member and the valve to vary the size of the fluid spray.

4. A valve assembly comprising a seat member, a valve cooperating with the seat member, a valve crab disposed against the seat member and provided with a central opening and provided with a plurality of openings, a conduit for supplying fluid to the valve, a cover secured to said conduit and provided with a threaded opening, a hollow bolt having external threads in engagement with the threaded opening in the cover and having internal threads and engaging the valve crab, and a nozzle having external threads in engagement with the internal threads in the hollow bolt making the nozzle adjustable in the hollow bolt toward and away from the seat member and the valve and the nozzle projecting through the central opening in the valve crab, the supply fluid entering through the last named openings in the valve crab and flowing through the seat member and valve and the fluid spray from the nozzle entering the flow path of the supply fluid within the confines of the valve crab so that the fluid spray is additionally guided to the seat member and valve by the supply fluid.

References Cited in the file of this patent

UNITED STATES PATENTS

| | | |
|---|---|---|
| 870,487 | Bertram | Nov. 5, 1907 |
| 920,779 | Rothchild | May 4, 1909 |
| 1,102,316 | Bayles | July 7, 1914 |
| 1,235,409 | Aldrich | July 31, 1917 |
| 2,378,607 | Watts | June 19, 1945 |
| 2,603,232 | Keammerer | July 15, 1952 |

FOREIGN PATENTS

| | | |
|---|---|---|
| 354,818 | Germany | June 16, 1922 |
| 86,258 | Sweden | May 5, 1936 |